T. SLOPER.
ANTISLIPPING STUD OR BLOCK.
APPLICATION FILED JUNE 3, 1909.
948,435.
Patented Feb. 8, 1910.
2 SHEETS—SHEET 1.
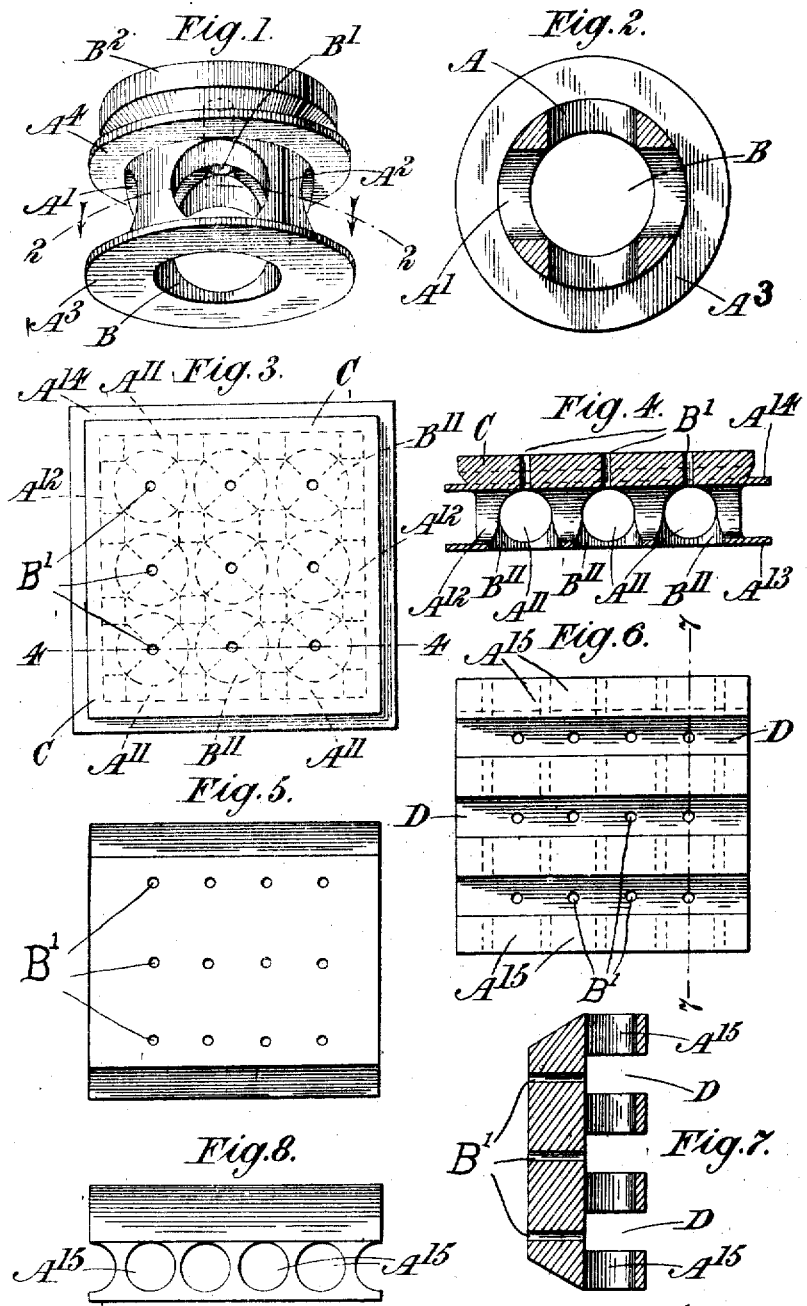

T. SLOPER.
ANTISLIPPING STUD OR BLOCK.
APPLICATION FILED JUNE 3, 1909.

948,435.

Patented Feb. 8, 1910.
2 SHEETS—SHEET 2.

UNITED STATES PATENT OFFICE.

THOMAS SLOPER, OF DEVIZES, ENGLAND.

ANTISLIPPING STUD OR BLOCK.

948,435.

Specification of Letters Patent.

Patented Feb. 8, 1910.

Application filed June 3, 1909. Serial No. 500,027.

*To all whom it may concern:*

Be it known that I, THOMAS SLOPER, a subject of the King of England, residing at Devizes, in Wiltshire, England, have invented certain new and useful Improvements in Antislipping Studs or Blocks, of which the following is a specification.

This invention is for improvements in or relating to non-slipping surfaces for elastic tires and other elastic goods and has for its object to provide a non-slipping stud or block which is so constructed that it can be firmly secured in the rubber or other elastic material with which it is to be employed.

It is well known that great difficulty is experienced in so securing the metallic or other studs employed for instance with tires that they do not become torn out from the same, as the rubber does not readily adhere to hard substances. To anchor the studs they have been provided with flanges embedded in the rubber or they have had split stems to project through the rubber so that they may be bent over on the opposite side and they have also been secured by pins passed through transverse holes in the stems of the studs but all of these devices are found to pull through the rubber as the latter, being elastic, yields and thereby allows the anchoring portion to pass.

According to this invention it is proposed to employ a stud or block having one or more passages that are approximately perpendicular to the crown of the stud, are open at the base to receive the rubber and are intersected by one or more transverse passages. When the rubber or other material is forced into the passages of such a stud it locks the same securely in place, as that in the perpendicular passage holds it against lateral displacement and that in the transverse passages holds it against displacement in a direction perpendicular to the crown.

Figure 9:
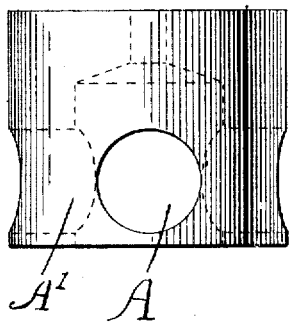
Figure 10:
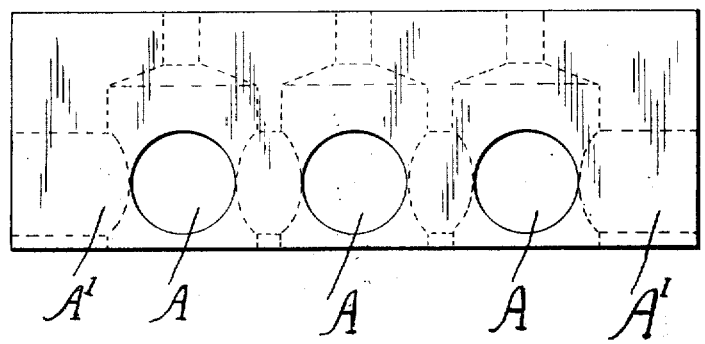

In the accompanying drawings:—Figure 1 shows in perspective a stud constructed according to one method of carrying out this invention: Fig. 2 is a section of the same on the line 2—2 looking in the direction of the arrow: Fig. 3 is a plan of a modified form of stud or block but embodying the same essential features as that shown in Figs. 1 and 2: Fig. 4 is a section on the line 4—4 of the stud or block shown in Fig. 3: Fig. 5 is a plan of yet another modified form of stud or block: Fig. 6 is an underside view of the same: Fig. 7 shows a section through the block on the line 7—7 of Fig. 6: Fig. 8 is a side view of the block taken at right angles to the section on the line 7—7: Fig. 9 is an elevation of a stud similar to that shown in Figs. 1 and 2, and Fig. 10 is a further modification of that shown in Figs. 3 and 4.

Like letters indicate like parts throughout the drawings.

The stud shown in Fig. 1 is bored transversely in two directions as shown at A A' these passages intersecting each other. The stud is also bored in a direction that is approximately perpendicular to the crown the resulting passage B being open at the base, but extending only part way to the crown. There is, however, a smaller passage B' that extends from the intersecting passages A A' and B to the surface of the crown $B^2$. The stem $A^2$ which is rendered hollow by the passage B, is surmounted at its base by a flange $A^3$; near the crown is a second flange $A^4$. It will be seen that if such a stud is embedded in the rubber or other elastic material with which it is to be employed and the material is forced into the passages A A' and B so that it constitutes a solid core through the stud, the latter is firmly held against displacement in a direction perpendicular to the crown by the rubber in the passages A A' and against displacement laterally by that in the passage B. The flange $A^3$ also forms a foundation for the stud and resists perpendicular displacement in both directions and the flange $A^4$ which is preferably flush with the surface of the material in which it is embedded resists perpendicular displacement in one direction. The small passage B' is a vent whereby the air escapes when the rubber or other material is pressed into the passages A A' and B. The passage B' may or may not be filled with elastic material and is intended to permit the egress of air as the material is forced into the interior of the stud. Obviously a number of these studs may be combined to form a single block as shown at C in Figs. 3 and 4. In such case the perpendicular passages $B^{11}$ are set out in line with each other so that the intersecting passages $A^{11}$ and $A^{12}$ may traverse the same in straight lines as shown. This construction permits the blocks to be formed from solid metal by drilling. Flanges $A^{13}$ $A^{14}$ similar to the flanges $A^3$ $A^4$ are also provided.

In Figs. 5 to 8 a block similar to that shown in Figs. 3 and 4 is produced by slightly different means. open passages or channels D being substituted for the passages B and A¹. These channels are provided on the underside of the block and are traversed by the passages $A^{15}$. It will be seen that this block provides a series of locking cores that extend through the passages $A^{15}$ and prevent displacement in a perpendicular direction or in a direction transverse to that of the passage while the rubber in the open passages or channels D prevents displacement in a direction transverse to those channels. If the blocks are made from the solid the channels D can be milled out and only the passages $A^{15}$ need be drilled.

Some varieties of rubber are more easily united to and form a more satisfactory juncture with metal than others and the interior of the studs or blocks may be filled with rubber or other composition of this class if desired, the whole being then embedded in the main body of the elastic material. Such a construction falls within the scope of this invention although no claim is made for embedding the stud in or filling it with a special class of rubber or composition which is afterward with the stud, embedded in another class of rubber or composition.

If desired the proportions of the stud may differ from those shown in the drawings for instance the head and stem portions may be of the same size and the flanges may be dispensed with as shown in Figs. 9 and 10.

It will be understood that when dealing with rubber the rubber is forced into the studs or blocks prior to vulcanization and the whole afterward vulcanized together.

What I claim as my invention and desire to secure by Letters Patent is:—

1. A stud or block for the purpose described having a cavity that extends from the base toward the crown and is open at the base, to receive the material in which the stud is to be embedded, and a passage that intersects said cavity and is open at the side of the stud or block to receive said material.

2. A stud or block for the purpose described having a cavity that extends from the base toward the crown and is open at the base, to receive the material in which the stud is to be embedded, a passage that intersects said cavity and is open at the side of the stud or block, to receive said material, and a second passage that intersects the first and also the cavity and is open at the side of the stud or block to receive said material.

3. A stud or block for the purpose described having a cavity that extends from the base toward the crown and is open at the base, to receive the material in which the stud is to be embedded, a passage that intersects said cavity and is open at the side of the stud or block, to receive said material, and a lateral flange on the stud that lies in a plane approximately parallel to the face of the crown for the purpose of resisting displacement in a direction perpendicular to such face.

4. A stud or block for the purpose described having a cavity that extends from the base toward the crown and is open at the base, to receive the material in which the stud is to be embedded, but is closed at the crown except for a vent orifice (B′), and a passage that intersects the cavity and is open at the side of the stud or block to receive said material.

5. A stud or block for the purpose described having a plurality of cavities that extend from the base toward the crown and are open at the base, to receive the material in which the stud is to be embedded, and a plurality of passages that intersect said cavities and are open at the side of the stud or block to receive said material.

In testimony whereof I have signed my name to this specification in the presence of two subscribing witnesses.

THOMAS SLOPER.

Witnesses:
FREDERICK JAMES CROSLEY,
HAROLD PARSONS.